April 23, 1957 R. W. SELLECK 2,789,364
ELEVATION MEASURING INSTRUMENT
Filed April 28, 1950 4 Sheets-Sheet 1
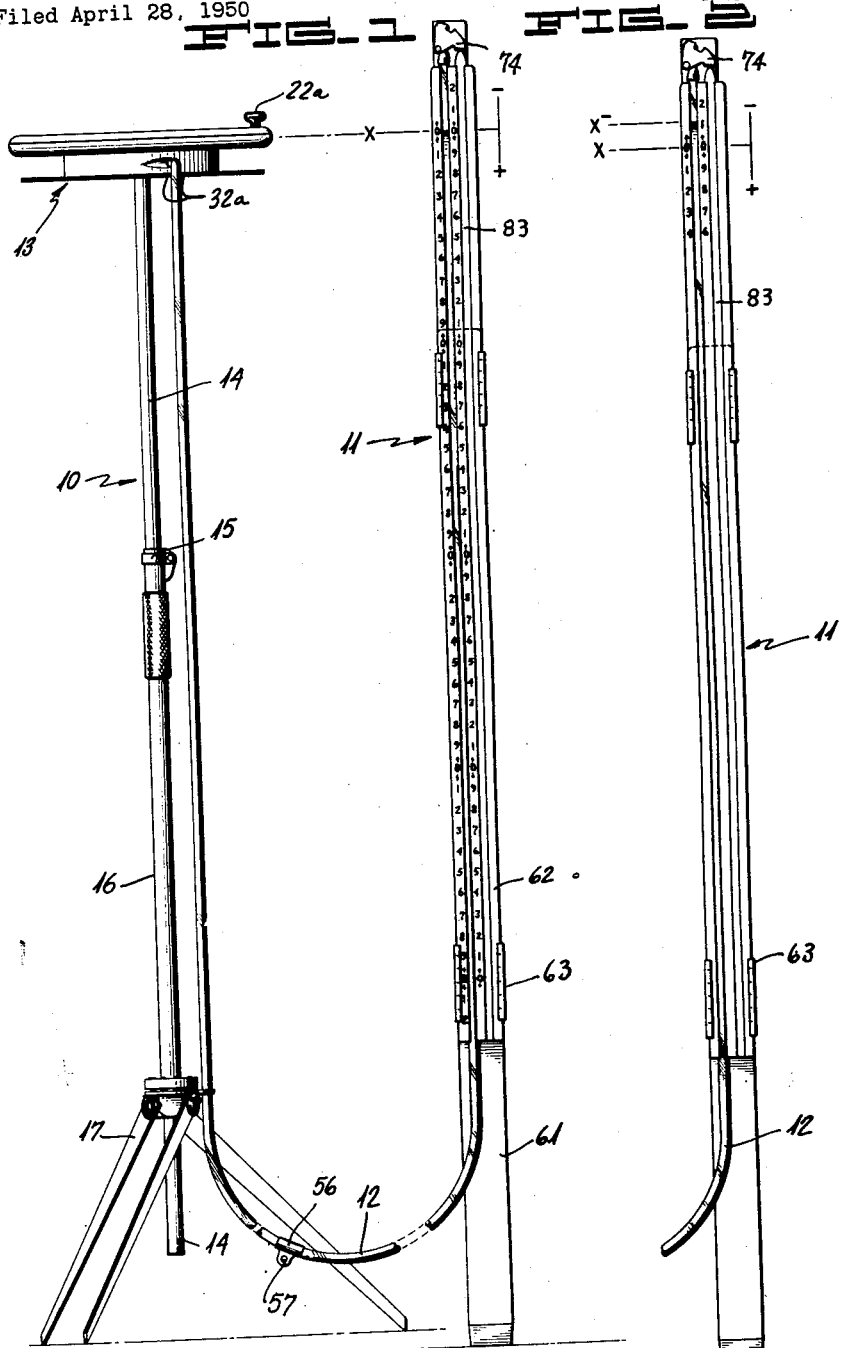
Inventor
ROBERT W. SELLECK
By
Harper Allen
Attorney

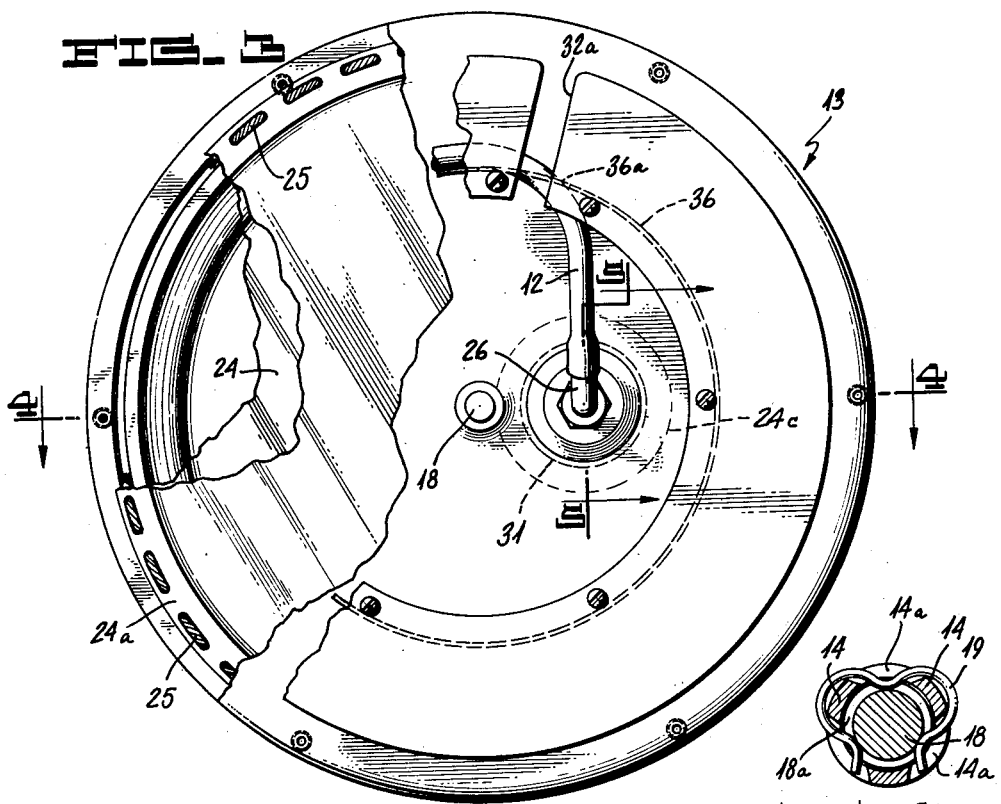
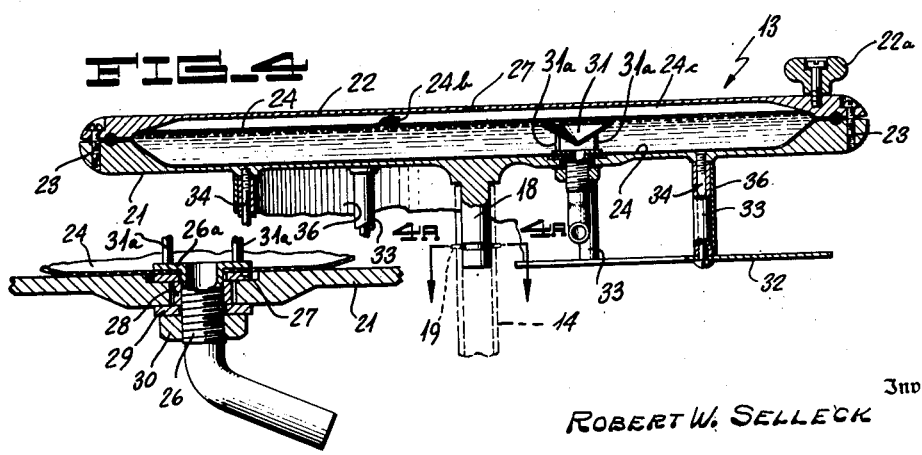

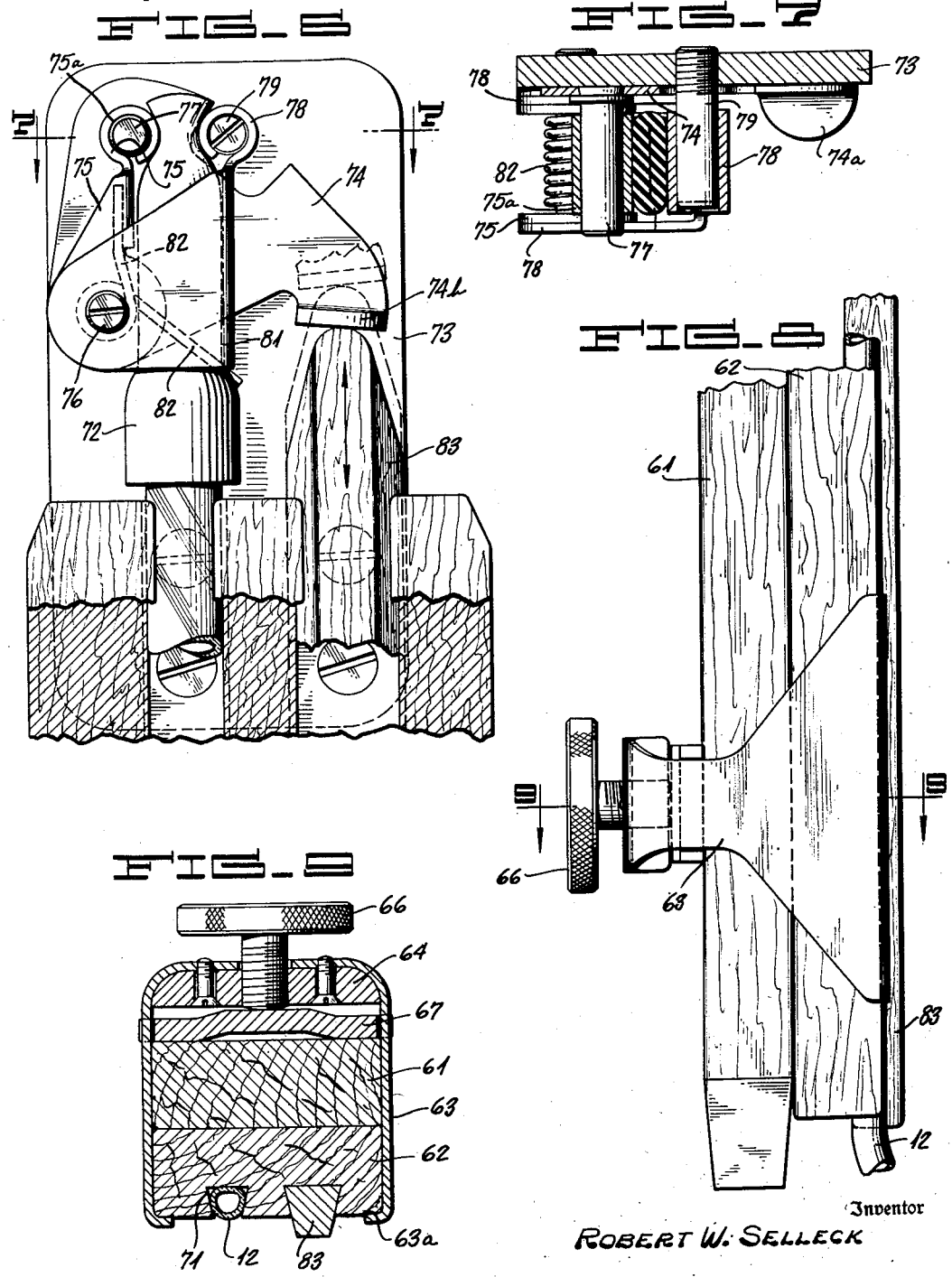

April 23, 1957 R. W. SELLECK 2,789,364
ELEVATION MEASURING INSTRUMENT
Filed April 28, 1950 4 Sheets-Sheet 4
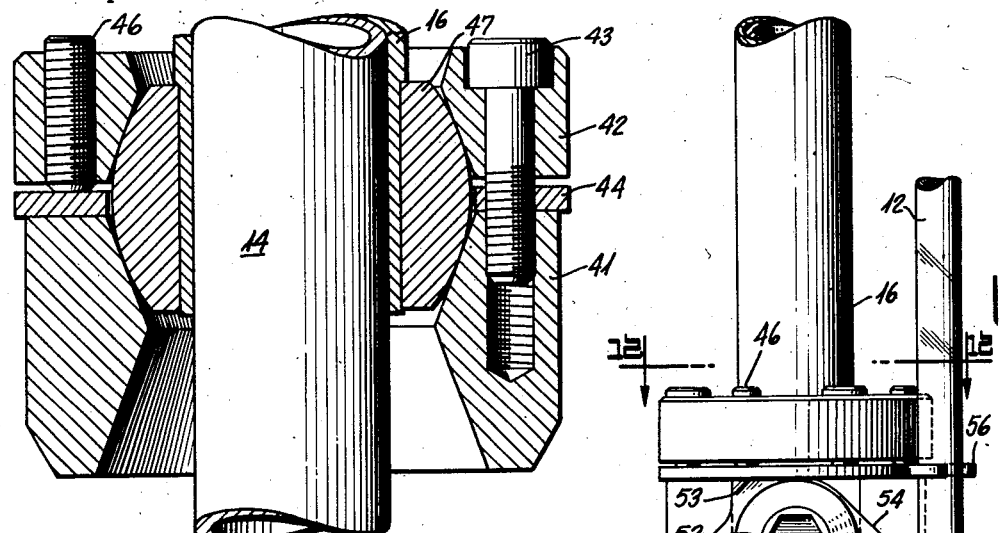
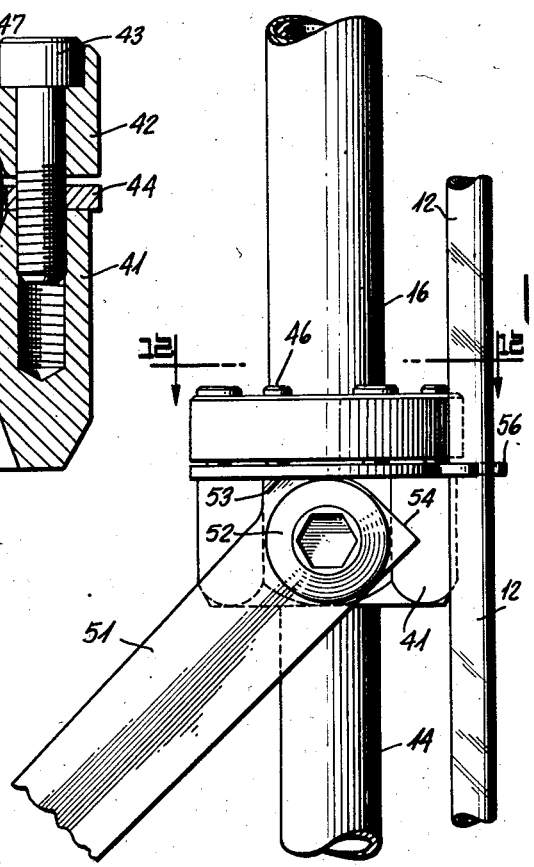
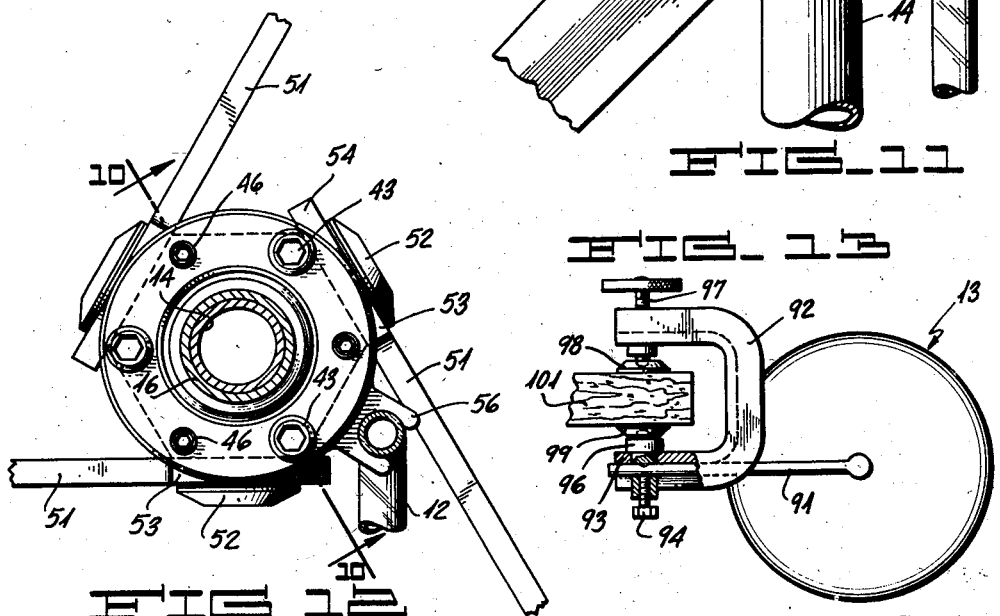
Inventor
ROBERT W. SELLECK
By Harper Allen
Attorney

United States Patent Office 2,789,364
Patented Apr. 23, 1957

2,789,364

ELEVATION MEASURING INSTRUMENT

Robert W. Selleck, San Jose, Calif.

Application April 28, 1950, Serial No. 158,808

8 Claims. (Cl. 33—209)

The instant invention relates to hydraulic measuring instruments and is concerned more particularly with an instrument of the above character in which a liquid reservoir is provided so that a direct reading measuring instrument or tube can be employed. This application is a continuation in part of my co-pending application now abandoned, Serial No. 779,161, filed October 10, 1947, for Elevation Measuring Instrument.

The general object of the invention is to provide an improved hydraulic elevation measuring instrument.

Another object of the invention is to provide an instrument of the above character in which a relatively large horizontal cross-section of liquid is provided in a reservoir or reference portion of the instrument so that changes in elevation of the measuring instrument, change in the temperature of the fluid, and changes in the volume of the hose will not substantially affect the reference level of the liquid in the reservoir.

A further object of the invention is to provide an instrument of the above character which employs a direct reading measuring tube or element so that a single unskilled operator can use the instrument.

Another object of the invention is to provide an instrument of the above character in which it can be handled and transported without loss of liquid from or entry of air into the hydraulic system.

Another object of the invention is to provide an instrument of the above character in which the liquid reservoir can be readily adjusted to the desired position without need for extremely accurate leveling thereof.

A further object of the invention is to provide an instrument of the above character in which the tube extending from the reference portion of the instrument to the measuring portion can be handled conveniently, stored easily, and placed and removed with reference to the scale with maximum ease.

Other objects and advantages of the invention will be apparent from the following description of a preferred embodiment thereof as illustrated in the accompanying drawings, in which:

Figure 1 is an elevational view of the measuring instrument.

Figure 2 is an elevational view of the scale stick or measuring portion of the instrument as shown in a different position for reading a difference in elevation of that position.

Figure 3 is a bottom plan view of the reservoir of the reference element with certain parts broken away to illustrate details of construction.

Figure 4 is a transverse sectional view taken as indicated by the line 4—4 in Figure 3.

Figure 4a is a detail sectional view taken as indicated by the line 4a—4a in Figure 4.

Figure 5 is a sectional view taken as indicated by the line 5—5 in Figure 3.

Figure 6 is an enlarged elevational view of the upper end of the measuring element with certain parts shown in section.

Figure 7 is a sectional view taken as indicated by the line 7—7 in Figure 6.

Figure 8 is a side elevational view of a portion of the measuring element or stick illustrating the clamp construction.

Figure 9 is a sectional view taken as indicated by the line 9—9 in Figure 8.

Figure 10 is a sectional view of the tripod support of the reference instrument, the view being taken as indicated by the line 10—10 in Figure 12.

Figure 11 is an elevational view of the tripod mounting.

Figure 12 is a sectional plan view taken as indicated by the line 12—12 in Figure 11.

Figure 13 is a bottom plan view illustrating a modified mounting unit for the reference unit.

In accordance with the instant invention, the elevation measuring instrument comprises a reference element 10 (Figure 1) and a reading or measuring element 11 which are connected by a flexible tube 12 of a suitable resilient or bendable material, such as a plastic. In order to provide for direct reading (either positive or negative) of the difference of elevation between any desired starting or reference position of the measuring element and any subsequent position to which it is moved, the reference element is provided with a reservoir 13 which is of substantial cross-sectional area with respect to the inside cross sectional area of the tubing 12 so that variations in adjusting the tubing to different elevations will produce no material change in the liquid level of the reservoir 13. The reservoir 13 is carried by telescopic support tubes 14—16 carried by a tripod mounting structure 17, referred to in greater detail hereinafter. A clamp 15 is provided for securing the tubes 14 and 16 in an adjusted position.

Preferably the reservoir 13 is of liquid-tight construction to allow easy transportation and storage or handling of the instrument without loss of liquid. Referring to Figures 3, 4, and 5, the reservoir proper comprises a disc-like frame or housing including a bottom half 21 and an upper half 22 connected together about their peripheries by a plurality of suitable fastening screws 23. The bottom disc element 21 (Figures 3, 4, and 4a) is provided with a centrally disposed post 18 which is received rotatably within the upper end of the support tube 14 and is provided with an annular groove 18a to receive a spring wire latch 19 which has three inwardly bent latch portions extending through slots 14a of the tube 14. In this way the reservoir is connected detachably to its support and can be rotated thereon for a purpose later described. The top disc element 22 (Figure 4) carries a handle 22a.

Within the reservoir element 13, there is provided a flat disc-like bag 24 (Figures 3, 4, and 5) formed of a pair of sheets of flexible thermoplastic material having their edges heat-sealed together at 24a. A suitable securing strand 25 is sewed into the heat-sealed periphery to provide a ridge for seating in similar annular recesses of the disc elements 21 and 22. The bag 24 has a filling and bleeding tube 24b secured thereto and normally secured, as by a rubber band, in folded position to be sealed against entrance of air or leakage of liquid. The upper disc element 22 is perforated as at 27 to provide for admission and egress of air to within the disc. The lower plastic sheet of the flexible reservoir bag 24 is provided with an aperture engaged over a threaded coupling member 26. The inner edge of the sheet 24 is clamped between flange 26a of the coupling member 26 and a washer 27 seated in a recess of the lower disc element 21. A spacer 28 engages the washer 27 and a washer 29 spaced therefrom, the parts being held in clamped position by a nut 30. The coupling 26 is inclined outwardly and downwardly and has the tubing 12 connected thereto, as seen in Figure 3. A cone-shaped bubble deflector 31 is carried by studs 31a on the coupling 26, so that its apex lies substantially directly over the aperture in the coupling 26. In this way any air bubbles trapped in the tubing 12 and rising through the coupling 26 will be deflected upwardly and outwardly to avoid the possibility of re-entry of any such bubble into the coupling 26.

The reference element 13 (Figures 3 and 4) also provides a reel for storage of the tubing 12 and for this purpose has an annular plate 32 secured in spaced relation from the lower disc 21 by a plurality of spacing tubes 33 and securing bolts 34. A strip 36 of metal is secured about the spacing sleeves 34 to provide a continuous supporting surface for the tube, this strip 36 being notched at 36a to pass the tube 12, as seen in Figure 3. Also, the plate 32 is slotted at 32a to allow the tube 12 to be inclined as seen in Figure 1. This positioning of the tube 12, together with the inclination of the lower end of the coupling 26 insures flow of any bubbles into the bag 24.

The tripod support, used in connection with the reservoir element 13, is of special construction to allow easy tilting movement of the reservoir 13 to an approximately level position irrespective of the out-of-level condition of the ground on which the tripod is supported. The tripod support (Figures 1, 10-12) comprises spaced apart collars 41 and 42 secured together by a plurality of clamping screws 43 which pass freely through a spacing washer 44 interposed between the collars. Also, the upper collar 42 is provided with three threaded apertures to receive pressure screws 46 for a purpose later described. The interior surfaces of the collars 42 and 41 are frusto-conical in shape to form respective sockets for a ball-shaped journal element 47 press-fitted on the lower end of the tube 16 within which the tube 14 is slidably received. By virtue of the split construction of the socket element comprising the collars 41 and 42, a selected amount of frictional engagement between the socket and the ball 47 can be employed as provided for by adjustment of the press screws 46 and clamp screws 43. Three legs 51 are provided having respective pivot connections by studs 52 with the flat sides of the lower hexagon-shaped collar 41. The upper ends of the legs 51 having respective flat surfaces 53 for engagement with the lower face of the washer 44 in extended position of the associated leg 51 and a second flat surface 54 for engagement with this washer in the straight or collapsed position of the leg. It will be noted that the point of engagement of the surface 53 of each of the legs 51 is immediately adjacent a friction-adjusting screw 46. The washer 44 may be provided with slotted extension 56 (Figure 12) in which the tube 12 may be frictionally engaged for holding it in alignment with the standard comprising the tubing 14—16. The tubing 12 (Figure 1) is also provided with a collar 56 mounted thereon and having an apertured ear 57 by means of which the tubing 12 can be secured to a floor or wall and prevent upsetting of the reference element because of handling of the tubing.

Referring to Figures 1 and 6 through 9, the measuring element preferably comprises a pair of telescopically engaged sticks 61 and 62 which are slidably connected for adjustment between extended or collapsed positions by a pair of U-shaped clamps 63 having respective flanges 63a gripping the side edges of the front face of the stick 62 and carrying a threaded block 64 (Figure 9) having a clamping screw 66 associated therewith or engagement with a pressure plate 67 engaging the back face of the stick 61.

By means of the clamps 63, the stick 61 can be secured in any selected adjusted position with respect to the stick 62 either projecting upwardly for reading from an overhead surface or projecting downwardly, as shown in Figure 1, for reading from a ground or floor surface.

Referring to Figures 1 and 2, the face of the stick 62 is provided with a descending scale at the left side of a tube receiving groove 71 and an ascending scale at the right hand side of this groove, these scales comprising a series of numbers from "0" to "9" so that direct reading of either positive or negative difference in level can be accurately read in feet and tenths thereof. The face of each flange 63a carries five equally spaced index marks corresponding to the five 0's of the two scales. This enables an indication or marking by the operator of which "0" is used as a starting point on a given reading by adjusting the corresponding index mark to coincide with a selected number or scale graduation.

The tube 12 may be of smaller diameter at the end thereof carried by the stick 62 and is frictionally engaged within the groove 71 which is narrower at its opening than at its base, so that the tube can be stripped therefrom for winding on its storage reel. The end of the tube 12 is provided with a flexible tube extension 72 forming part of a valve mechanism having associated therewith a valve closing or pinch-off device. This mechanism operates under the operator's control so that the end of the tube is open for free movement of the liquid therein when making a reading and shut off so that no loss of liquid will occur when the instrument is laid down or transported from place to place, or when the tube is stripped off and the valve detached for winding on the reel. The stick 62 is provided with an upwardly extending plate 73 (Figures 6 and 7) on which a valve control lever 74 is carried by a flanged pivot stud 76. The control lever 74 carries a detachably mounted valve assembly for opening and closing the end of the tube. A stud 77 carried by the lever 74 has disposed thereabout the sleeve end 75a of U-shaped valve bracket 75 pivotally mounted on the stud 76. The sleeve end 75a engages one side of the tube extension 72 to urge it against a stop element in the form of a sleeve 78 disposed about a flanged stud 79 on the plate 73. The sleeve 78 is formed as a part of U-shaped tube supporting valve bracket 81, whose opposite sides are engaged over the stud 76. A torsion spring 82, having one end engaged with the bracket 81 and the other with the bracket 75, urges the lever 74 clockwise to tube-closing position, as seen in full lines in Figure 6. The control for opening the pinching valve at the end of the tube extension 72 comprises a trapezoidal-shaped control stick 83 slidably carried in a similarly shaped groove in the stick 62 and having finger notches along its full length. The end of the stick 83 engages under an ear 74a of the valve control lever 74. The dotted line position of the ear 74a in Figure 6 illustrates the movement of the parts to permit openings of the tube extension 72. It will be noted that the valve assembly including valve brackets 75 and 81 are detachable as a unit with respect to the cooperating studs 76, 77, and 79 so as to be removed while holding the end of the tube closed.

In operation, the measuring instrument is set up as illustrated in Figure 1 which is accomplished in part by unreeling the tube 12 from its reel on the reference element 13. Because of the rotatable mounting of the reference element and its frictional latching in position, the tubing can be stripped from the reference element when supported on the tube 14 as a bearing support in a minimum of time. The reference element 13 is adjusted on its ball support to an approximately level condition and to a convenient operating height by adjustment of the tubes 14 and 16. The measuring element or stick 61—62 is set in position with the tubing pressed therein. The height of stick 62 is then adjusted to bring the level of liquid therein to a desired zero point, for example the top zero point as shown in Figure 1, with the adjusting or control rod or slide 83 lifted to open the end of the tube so that the liquid can seek its level. The selected "0" of the multiple scale is indicated by adjustment of one of the clamps 63 so that its top index mark is at a selected graduation.

In this relation of the parts, the cross-sectional area of the liquid within the tube 12 at its point of reading is so small with reference to the total cross-sectional area within the reference element 13 that there is substantially no change in the level within the reference instrument 13 or reference reservoir for an entire displacement of the liquid within the tube for the length of the scale on the stick 62. For example, with a one-eighth inch inside diameter of the measuring tube and a twelve and one-half inch inside diameter of the reference reservoir, the ratio of the cross sectional areas would be ten thousand to one and changing the elevation of the measuring tube by plus or minus ten inches would result in the change in the elevation of the liquid surface in the reference reservoir of only plus or minus .001 inch.

As shown, the scale reads in feet and tenths of feet, although any desired graduations such as feet and inches and fractions of inches can be employed in accordance with a particular measuring system desired for use.

With the reference instrument remaining in place, the measuring stick 61—62 is moved to a second location where the level is to be read and is placed in upright position and the control stick 83 moved to open the top of the tube so that the liquid is free to seek the level of the level of liquid within the reservoir. As shown, this reads something over a one tenth foot difference in level. Subsequent measurements can be made moving the stick from place to place with the end of its tube closed and then opening the end of the tube at the time the liquid is to be allowed to seek its level for a reading. It will be noted that the extension stick 61 can be placed either above or below the graduated stick 62 so that roof or overhead elevations or differences in elevation can be read as well as differences in ground or floor level.

It will be noted that when the instrument is to be dismantled the tube 12 can be readily stripped from within its groove in the graduated stick 62 and the valve assembly pulled from studs on the plate 73 and, using the reservoir element as a reel, using the table 14 detached from the tripod, or a bearing handle, it can quickly be wound in place for transportation or storage. Also, the overall length of the tubing support 14—16 of the reference instrument collapses to no greater length than the measuring stick 62 which therefore determines the overall storage length necessary for the equipment.

Figure 13 is a bottom plan view illustrating a modified mounting unit for the reference unit 13, whereby this unit can be placed on studding, doors or the like. The unit 13, which is shown schematically, has its center mounting post carried in the socket end of a mounting rod 91 which is rotatably received in a sleeve member 96 in one arm 93 of a C-clamp 92. The rod 91 is retained rotatably in place by a screw 94. The C-clamp is provided with conventional pressure pads 98 and 99, and with a pressure adjusting screw 97 by means of which it can be clamped on a structural member 101, such as a stud or a door. This same clamping action locks rod 91 against rotation. The reference element 13 can be levelled by adjustment about the axis of the rod 91 and about the axis of the sleeve 96.

While I have shown and described certain preferred embodiments of the invention, it will be understood that the invention is capable of variation and modification from the form shown so that its scope should be limited only by the scope of the claims appended hereto.

I claim:

1. A hydraulic elevation measuring instrument comprising a reference element and a measuring element connected by a flexible tube, said reference element comprising a disc-like liquid reservoir and said measuring element comprising a tube for location at the elevations to be measured and said measuring element having graduations operatively related to said tube for measuring the height of liquid therein, said reference element having a height substantially less than its width to provide a plate-like structure having a constant level of liquid, the cross-sectional area of said reference element being of sufficient extent that the volume of liquid in said tube throughout the range of graduations associated therewith when added to or subtracted from the liquid reservoir will produce no substantial change in the liquid level of said reservoir.

2. In an elevation measuring instrument of the hydraulic type, a plate-like reference element including a normally closed flexible means forming a liquid reservoir, said reservoir having a height substantially less than its width to provide a structure having a constant level of liquid, a measuring element having a scale, a flexible tube extending from said means to said measuring element, and a normally closed valve mechanism connected to said tube.

3. In an elevation measuring instrument of the hydraulic type, a reference element including a disc-like flexible bag forming a liquid reservoir, a measuring element having a scale, a flexible tube extending from said bag and having an end portion mounted on said measuring element along said scale, and a valve mechanism connected to said end portion of said tube.

4. In an elevation measuring instrument of the hydraulic type having a measuring element including a scale, a reference element including a housing having a storage reel on one face thereof, a flexible bag within said housing forming a liquid reservoir, a flexible tube connected to said bag and extending from within said reel and having an end portion removably mounted on said measuring element along said scale.

5. In an elevation measuring instrument of the hydraulic type, a reference element including a disc-like housing, a disc-like flexible bag disposed within said housing and forming a liquid reservoir, an outlet leading downwardly from said bag through the lower surface of said housing, and bubble deflecting means carried by said bag above said outlet.

6. In an elevation measuring instrument of the hydraulic type, a reference element including a disc-like housing, a flexible air-tight bag mounted within said housing to form a liquid reservoir, a support for said housing providing rotatable mounting for said housing, a storage reel formed on one face of said housing, and a tube extending from within said housing for winding on said reel or for extending therepast when in use.

7. A hydraulic elevation measuring instrument comprising a reference element and a measuring element connected by a flexible tube, said reference element comprising a liquid reservoir including a pair of disk-like elements secured together and a flexible disk-like bag within said element, said reference element having a height substantially less than its width to provide a plate-like structure having a constant level of liquid, said measuring element comprising slidably engaged sticks, one of said sticks having means forming a longitudinal recess therein and having graduations extending along said recess, and a flexible tube connecting said reference element and said measuring element and having an end portion disposed in said recess adjacent said graduations.

8. A hydraulic elevation measuring instrument comprising a reference element and a measuring element connected by a flexible tube, said reference element comprising a disc-like liquid reservoir having a height substantially less than its width to provide a plate-like structure having a constant level of liquid, said measuring element comprising slidably engaged members, one of said members having means forming a longitudinal recess therein and having graduations along said recess, the end of said flexible tube being disposed in said recess adjacent said graduations.

(References on following page)

References Cited in the file of this patent

UNITED STATES PATENTS

| | | |
|---|---|---|
| Re. 13,240 | Gutwein, Jr. | May 16, 1911 |
| 143,907 | Hyde | Oct. 21, 1873 |
| 277,037 | LeGrande | May 8, 1883 |
| 397,294 | Karr | Feb. 5, 1889 |
| 547,864 | Sherman | Oct. 15, 1895 |
| 566,698 | Raab | Aug. 25, 1896 |
| 653,629 | Schneider | July 10, 1900 |
| 762,072 | Lord | June 7, 1904 |
| 763,241 | Ballance | June 21, 1904 |
| 872,183 | Jenning | Nov. 26, 1907 |
| 909,529 | Blair | Jan. 12, 1909 |
| 919,934 | Nugent | Apr. 27, 1909 |
| 1,009,490 | Driscoll | Nov. 21, 1911 |
| 1,060,602 | Jenning | May 6, 1913 |
| 1,211,718 | Kuehner | Jan. 9, 1917 |
| 1,231,162 | Husby | June 26, 1917 |
| 1,372,431 | Husi | Mar. 22, 1921 |
| 1,669,183 | Wilson | May 8, 1928 |
| 1,801,513 | Lindberg | Apr. 21, 1931 |
| 1,914,851 | Fyfe | June 20, 1933 |
| 1,970,883 | Bryant | Aug. 21, 1934 |
| 2,371,632 | Lippincott | Mar. 20, 1945 |
| 2,389,664 | Giannini | Nov. 23, 1945 |
| 2,419,306 | Zeiler | Apr. 22, 1947 |
| 2,422,960 | Giannini | June 24, 1947 |
| 2,428,346 | White | Sept. 30, 1947 |
| 2,438,758 | Leach | Mar. 30, 1948 |
| 2,444,767 | Cobean | July 6, 1948 |
| 2,558,004 | Schmidt | June 26, 1951 |
| 2,566,102 | Waldo | Aug. 28, 1951 |

FOREIGN PATENTS

| | | |
|---|---|---|
| 338,880 | France | 1903 |
| 185,806 | Great Britain | Sept. 21, 1922 |
| 620,208 | Germany | 1933 |